(12) United States Patent
Jensen et al.

(10) Patent No.: US 7,092,484 B1
(45) Date of Patent: Aug. 15, 2006

(54) MODEL-ASSISTED RECONSTRUCTION OF VOLUMETRIC DATA

(75) Inventors: Terrence C. Jensen, Ames, IA (US); Joseph N. Gray, Ames, IA (US)

(73) Assignee: Iowa State University Research Foundation, Inc., Ames, IA (US)

( * ) Notice: Subject to any disclaimer, the term of this patent is extended or adjusted under 35 U.S.C. 154(b) by 347 days.

(21) Appl. No.: 10/461,992

(22) Filed: Jun. 13, 2003

Related U.S. Application Data

(60) Provisional application No. 60/388,762, filed on Jun. 14, 2002.

(51) Int. Cl.
*A61B 6/02* (2006.01)
*G06K 9/62* (2006.01)
*G06K 9/64* (2006.01)
*B22D 46/00* (2006.01)

(52) U.S. Cl. .............. 378/41; 378/58; 378/62; 250/252.1; 356/394; 348/42; 164/4.1; 164/250.1

(58) Field of Classification Search ........... 378/41, 378/207, 53, 54, 62, 58, 57; 250/252.1; 356/391–394, 237.1, 237.2, 237.5; 348/42, 348/43, 46; 164/4.1, 451, 250.1, 505; 382/128, 382/132, 154, 141
See application file for complete search history.

(56) References Cited

U.S. PATENT DOCUMENTS

| | | | |
|---|---|---|---|
| 4,064,440 A | 12/1977 | Roder | |
| 4,875,165 A | 10/1989 | Fencil et al. | |
| 4,878,169 A | 10/1989 | Toner et al. | |
| 4,920,491 A | 4/1990 | Eberhard et al. | |
| 5,291,535 A | 3/1994 | Baker et al. | |
| 5,337,611 A | 8/1994 | Fleming et al. | |
| 5,526,442 A | 6/1996 | Baba et al. | |
| 5,561,696 A | 10/1996 | Adams et al. | |
| 5,566,341 A | 10/1996 | Roberson et al. | |
| 5,621,811 A | 4/1997 | Roder et al. | |
| 5,687,209 A | 11/1997 | Adams | |
| 5,801,312 A | 9/1998 | Lorraine et al. | |
| 5,884,685 A * | 3/1999 | Umezawa et al. | .......... 164/453 |
| 5,909,476 A | 6/1999 | Cheng et al. | |
| 6,002,738 A | 12/1999 | Cabral et al. | |

(Continued)

FOREIGN PATENT DOCUMENTS

DE    100 10 724 A 1    9/2000

(Continued)

OTHER PUBLICATIONS

One Vision for the Future of Endoscopy.

(Continued)

*Primary Examiner*—Craig E. Church
*Assistant Examiner*—Krystyna Suchecki
(74) *Attorney, Agent, or Firm*—McKee, Voorhees & Sease, P.L.C.

(57) ABSTRACT

The present invention is a method for inspecting objects. The method includes obtaining a structural model of a first object, the model providing dimensions and material properties for the first object, inspecting a second object to provide inspection data for at least two views of a structure of the second object, comparing inspection and predicted data based on the structural model of the first object and a simulation of the inspection process, reconstructing stereographic data for the second object based on the structural model of the first object and contributions of the inspection data of the second object. In another embodiment, where there is a structural model of an object, the object can be subjected to a dynamic process and the object is inspected throughout the process.

17 Claims, 6 Drawing Sheets

U.S. PATENT DOCUMENTS

| | | | |
|---|---|---|---|
| 6,018,562 A | 1/2000 | Willson | |
| 6,031,565 A | 2/2000 | Getty et al. | |
| 6,115,449 A | 9/2000 | Jang et al. | |
| 6,256,372 B1 | 7/2001 | Aufrichtig et al. | |
| 6,393,095 B1 * | 5/2002 | Robinson | 378/58 |
| 6,430,728 B1 | 8/2002 | Goruganthu | |
| 6,690,841 B1 * | 2/2004 | Nguyen et al. | 382/294 |
| 6,697,508 B1 * | 2/2004 | Nelson | 382/131 |
| 6,776,212 B1 * | 8/2004 | Fulton et al. | 164/4.1 |
| 6,903,821 B1 * | 6/2005 | Nara et al. | 356/394 |
| 6,904,118 B1 * | 6/2005 | Wu et al. | 378/5 |
| 6,904,121 B1 * | 6/2005 | Claus et al. | 378/21 |
| 2003/0016781 A1 | 1/2003 | Huang | |

FOREIGN PATENT DOCUMENTS

| | | |
|---|---|---|
| EP | 0928460 | 5/2003 |
| WO | WO 98/12667 | 3/1998 |
| WO | WO 99/06956 | 2/1999 |
| WO | WO 02/068899 A3 | 9/2002 |

OTHER PUBLICATIONS

World Congress Biomechanics, Symposium Sessions by Topic Computer Assisted Radiology and Surgery, www.cars-int.de.

J.P.O. Evans M. Robinson and S.X. Godber, Pseudo-Tomographic X-Ray Imaging for Use in Aviation Security, IEEE AES Systems Magazine, Jul. 1998.

Edward R. Doering, John P. Basart and Joseph N. Gray, Three-Dimensional flaw reconstruction and dimensional analysis using a real-time X-ray imaging system, NDT & E International vol. 26, No. 1, 1993.

Edward Raymond Doering, Three-Dimensional flaw reconstruction using a real-time X-ray imaging system, A Dissertation submitted to the Graduate Faculty, Iowa State University, 1992.

* cited by examiner

MODEL-ASSISTED RECONSTRUCTION OF VOLUMETRIC DATA

CROSS-REFERENCE TO RELATED APPLICATIONS

This application is a conversion of and claims benefit of priority from Provisional U.S. application 60/388,762 filed Jun. 14, 2002.

BACKGROUND OF THE INVENTION

In various manufacturing or other processes it is desirable to provide for nondestructive evaluation of items being produced. It is particularly desirable to provide for as complete as possible three dimensional information about an object, including both exterior and interior features. Various inspection techniques, such as computed tomography, magnetic resonance imaging, microwave, and acoustic wave imaging have been developed to address this need. The problem with these types of methods is that they often require long measurement times to produce the needed measurements. Thus, it is not practical to use these types of methods. Consider, for example, a case where the material being inspected is flowing, such as molten metal in a casting or fluid mixtures flowing through a pipe. The slow inspection techniques listed previously can not provide much useful information about these dynamic processes.

One specific example of an application where it would be desirable to provide three dimensional representations or visualizations relates to metal casting. Casting is a convenient way to manufacture complex metal shapes. However, understanding the dynamics of this process is a challenging problem. Although, real-time radiography of metal pours has given some insight into the problem, the images obtained are only two-dimensional projections that provide limited information on the dynamics of the process for complex geometries such as engine blocks.

Another specific example of an application where it would be desirable to provide three dimensional representations or visualizations relates to inspecting of complex structures formed from multiple layers. Inspection issues include quantifying cracks, porosity, density gradients and delaminations between layers.

These same problems are encountered with a number of different types of objects, inspection techniques, and manufacturing processes. Therefore, it is a primary object, feature, or advantage of the present invention to provide for three-dimensional information about an object.

It is another object, feature, or advantage of the present invention to provide for three-dimensional information about an object in a rapid, preferably real-time manner.

Another object, feature, or advantage of the present invention is to provide for three-dimensional information about an object that can be used in a manufacturing or production process.

These and/or other objects, features, or advantages of the present invention will become apparent from the disclosure that follows and/or the claims.

SUMMARY OF THE INVENTION

The present invention provides for three-dimensional information about an object to be provided in a useable manner. The three-dimensional information can be used within a manufacturing process such as to reject defective parts on a production line or to provide feedback for the manufacturing process. The present invention lends itself to manufacturing and/or other applications as the present invention is capable of being used for visualization of dynamic processes, such as, but not limited to inspection of flowing materials or inspection of objects in operation.

The present invention recognizes that model information can be used to assist in the reconstruction of a three-dimensional image of an object from inspection data. According to one aspect of the present invention, a structural model of a first object is obtained. The model preferably provides dimensions and material properties associated with the first object. Next, a second object is inspected to provide inspection data for at least two views of the structure of the second object. This inspection data is compared with predicted data that is based on the structural model of the first object and a simulation of the inspection process. Then, stereographic data for the second object is reconstructed based on the structural model of the first object and contributions of the inspection data of the second object. The stereographic data can be used to produce a three-dimensional image of the second object. Thus, model information is used to assist in the reconstruction of a three-dimensional images from inspection data.

The present invention also provides for x-ray inspection of a dynamic process. A structural model associated with an object is obtained. The model includes dimensions and material properties associated with the object. Then the dynamic process associated with the object is initiated. The object is inspected during the dynamic process to provide at least two views of the object acquired synchronously. Then, stereographic data of the object during the dynamic process is reconstructed from the at least two views. The object can be inspected multiple times throughout the dynamic process, and the stereographic results can be combined to produce movies of the process.

According to another aspect of the present invention, a method for inspecting objects is provided. The method includes obtaining a structural model of a first object, the model providing dimensions and material properties for the first object. Then the first object is divided into a plurality of regions, with each region preferably being a voxel. The inspection process is modeled and therefore a simulation of the inspection process is performed on the first object in order to generate predicted data. The contribution of each of the plurality of regions to the predicted data is determined. Next a second object or test object is inspected in order to provide inspection data. The inspection data is derived from at least two views of the structure of the second object. A comparison is then made between the inspection data and the predicted data. The material properties of each of the plurality of regions in the first object are then modified according to the difference between the inspection data and predicted data. The steps of simulating, comparing, and modifying are repeated until the difference between the inspection data and the predicted data is minimized. At this point, three-dimensional information for the second object can be represented by a collection of modified material properties for the plurality of regions of the first object. Thus, model information is used to assist in the reconstruction of three-dimensional information.

DETAILED DESCRIPTION OF EXEMPLARY EMBODIMENTS

The present invention relates to providing three-dimensional information about objects for visualization or other purposes. The present invention can be used with dynamic processes so is well-suited for various manufacturing processes. The present invention uses model information to assist in the reconstruction of three-dimensional information or a three-dimensional image of an object in combination with inspection data.

The present invention uses stereographic measurement methods. Stereographic measurement methods use two (or more) two-dimensional projections to calculate the three-dimensional location of the features in an object. Thus, two (or more) views can be used to produce a three-dimensional representation.

Figure 1:
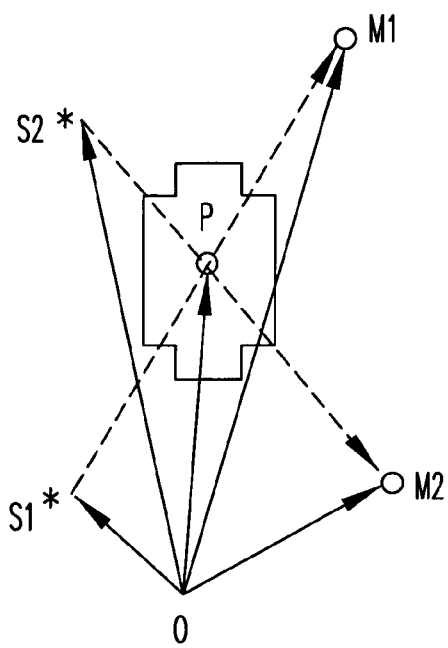
FIG. 1 provides an illustration of a generalized x-ray stereography measurement method wherein S1 and S2 are x-ray sources, and M1 and M2 are projections of point of interest P onto detectors.

The general idea used in stereography measurements is indicated in FIG. 1. Two sources, S1 and S2 are used to produce projection images of a sample. A point of interest in the sample, P, will project to the points M1 and M2, which could be in a single detector if the sources are pulsed sequentially, or in separate detectors, each arranged to intercept the beam of only one of the sources. These points are represented by vectors emanating from the origin, O, of an established coordinate system.

Figure 2:
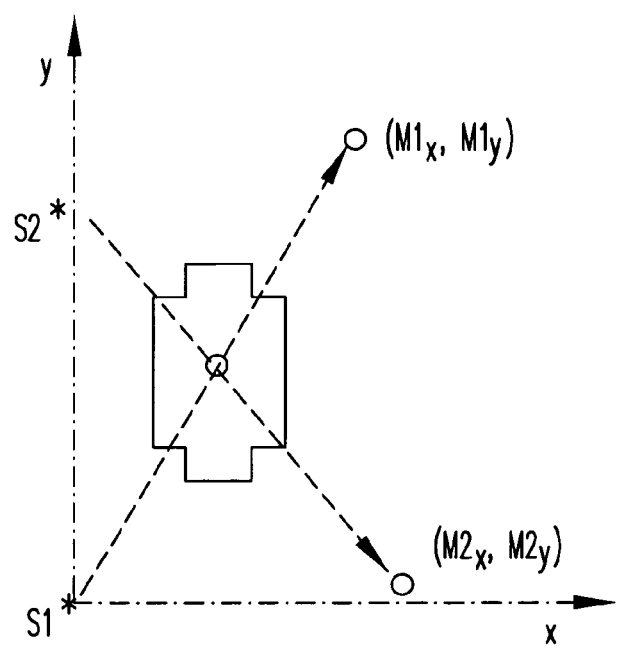
FIG. 2 is a simplified 2-dimensional representation of a stereography problem.

The two lines, (S1,M1) and (S2,M2), intersect at P. The general solution for the coordinates of P can be obtained through some matrix calculations. For a simplified demonstration of the concept, it is noted that the two lines form a plane, so in that plane, the problem is reduced to solving a system of two equations for two unknowns (see FIG. 2). In FIG. 2, take the origin of the coordinate system to be at S1 with S2 along the y-axis. Then the equations for the two lines passing through P can be written:

$$y=(M1_y/M1_x)x$$

$$y=S2+((M2_y-S2)/M2_x)x$$

This has the solution:

$$P_x=S2/[M1_y/M1_x-(M2_y-S2)/M2_x]$$

$$P_y=S2/[1-M1_x(M2_y-S2)/(M1_yM2_x)]$$

As long as it is possible to identify the same feature in the two images, the coordinates of the corresponding point of interest can be uniquely determined. Fiducial markers (for example, lead strips) placed at known locations on the outer surface of the sample are used to help correlate points of interest in the two images. This approach was used by Doering [1], herein incorporated by reference in its entirety, to measure selected points in several small samples. The present invention uses these stereographic methods in combination with information from an ideal object to produce three-dimensional representations from only two (or more) views.

Figure 3:
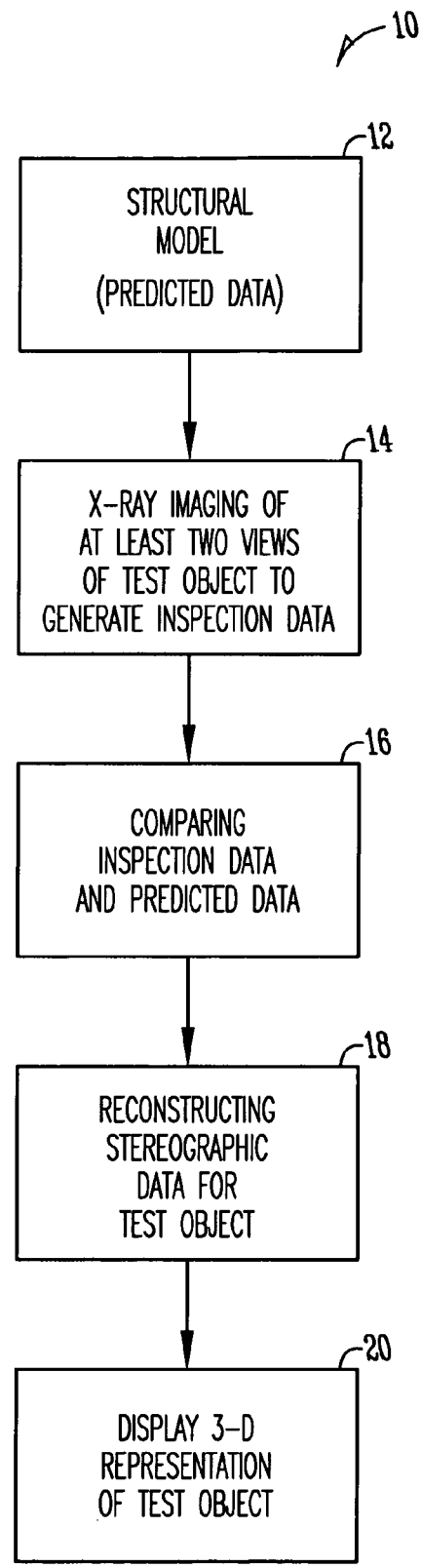
FIG. 3 is a flow chart showing one method according to the present invention.

FIG. 3 illustrates one embodiment 10 of the methodology of the present invention. In a first step 12, a structural model of an object is obtained. This object is sometimes considered the "ideal" object. The structural model, which can include or be derived from a CAD model provides predicted data that is used in subsequent steps of the process. The model contains various information about the ideal object including dimension information, material information, and other information that may be useful or desirable depending upon the particular application or type of object being modeled and properties associated therewith. The material information can include material composition, porosity, density or other material properties. Where the material information includes material composition, preferably the material composition includes at least two dissimilar properties such that the materials can be more readily distinguished from each other. The present invention contemplates that the model can be derived from a CAD file.

In a second step 14, x-ray imaging of at least two views of a test object are obtained to generate inspection data. In step 16, the inspection data and the model data that is associated with the ideal object are compared. Thus, differences between the ideal object and the test object can be determined.

In step 18, reconstruction of stereographic data for the test object is performed. The reconstruction is based on the structural model for the ideal object and contributions of the inspection data of the test object.

Then, an optional step 20 provides for displaying a 3-D representation of the test object. The 3-D representation is based on the reconstruction of the previous step. Although it is not always needed, it is often desirable to display the 3-D representation to provide a convenient method of displaying information about the test object. For example, different colors can be used to represent different types of materials or to otherwise represent material properties.

Figure 4:
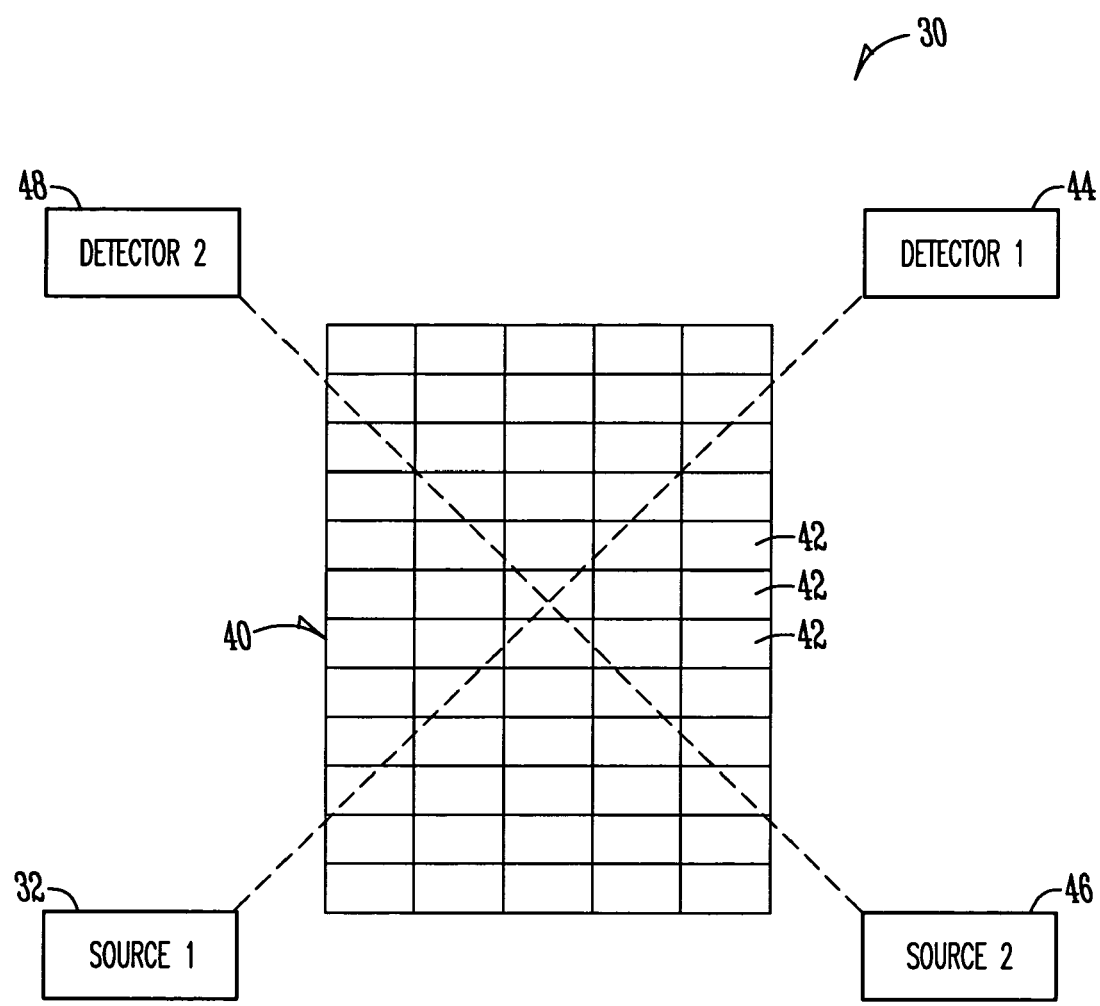
FIG. 4 illustrates one embodiment of an imaging setup according to the present invention.

FIG. 4 illustrates one acquisition set-up that can be used according to one embodiment of the present invention. The acquisition set-up 30 includes a first source 32. The first source 32 transmits x-rays through a test object 40. The test object 40 shown is divided into a plurality of voxels 42. Thus, each x-ray will pass through one or more voxels 42 before being detected by a first detector 44. Similarly, x-rays emitted from a second source 46 will pass through one or more voxels 42 before being detected by a second detector 48. The voxels can be of various sizes and shapes, the selection of which is based upon the amount of computational resources, time constraints, resolution of images, and other factors which may be present in a particular application.

Although two detectors and sources are shown, other set-ups can be used. For example, any number of detectors can be used to provide additional views of the test object 40. Alternatively, the test object 40 or a single detector and emitter could be rotated or otherwise repositioned.

Figure 5:
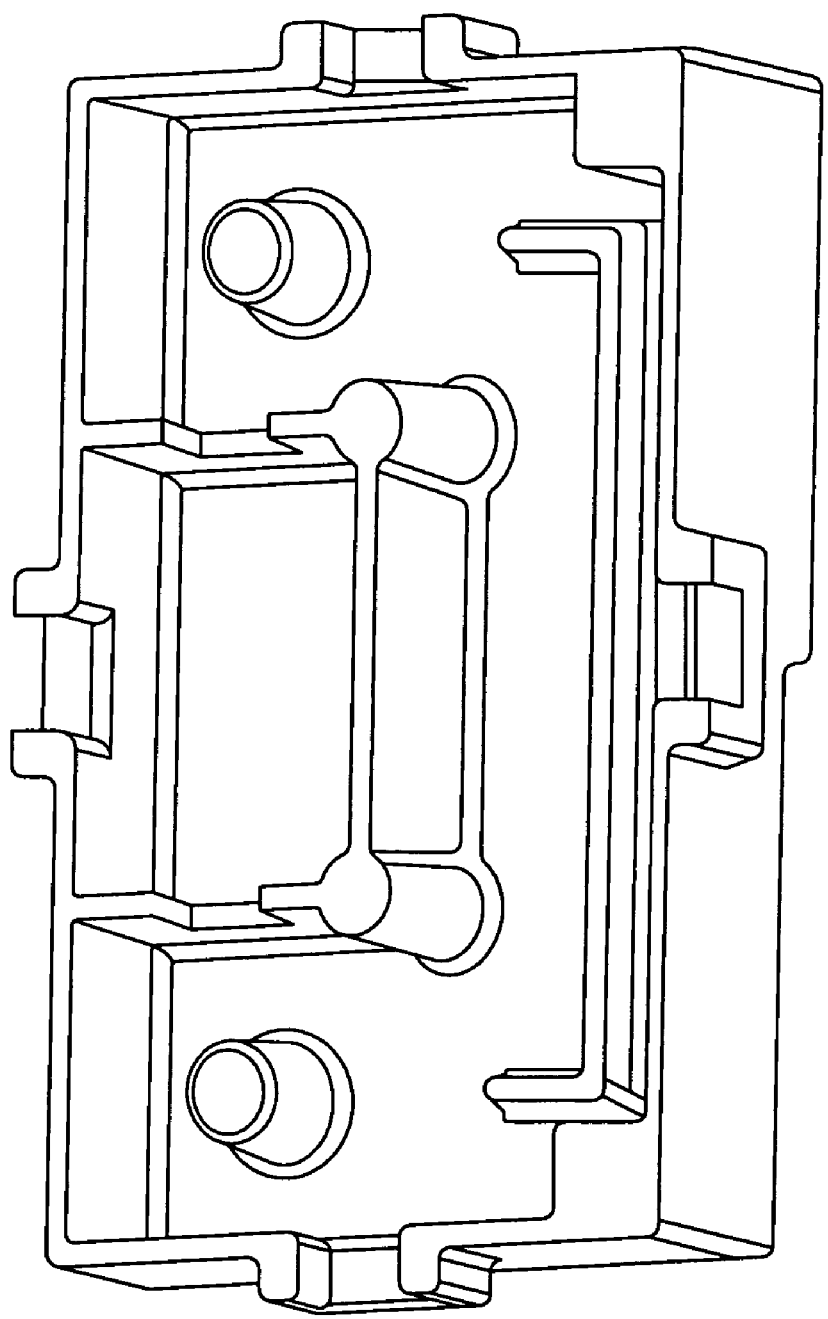
FIG. 5 illustrates an image of a CAD model.

FIG. 5 illustrates one example of a CAD model that provides an ideal object. A CAD model can include known dimensions and known material properties. The object shown in FIG. 5 is a casting constructed of two materials—foam and aluminum.

Figure 6:
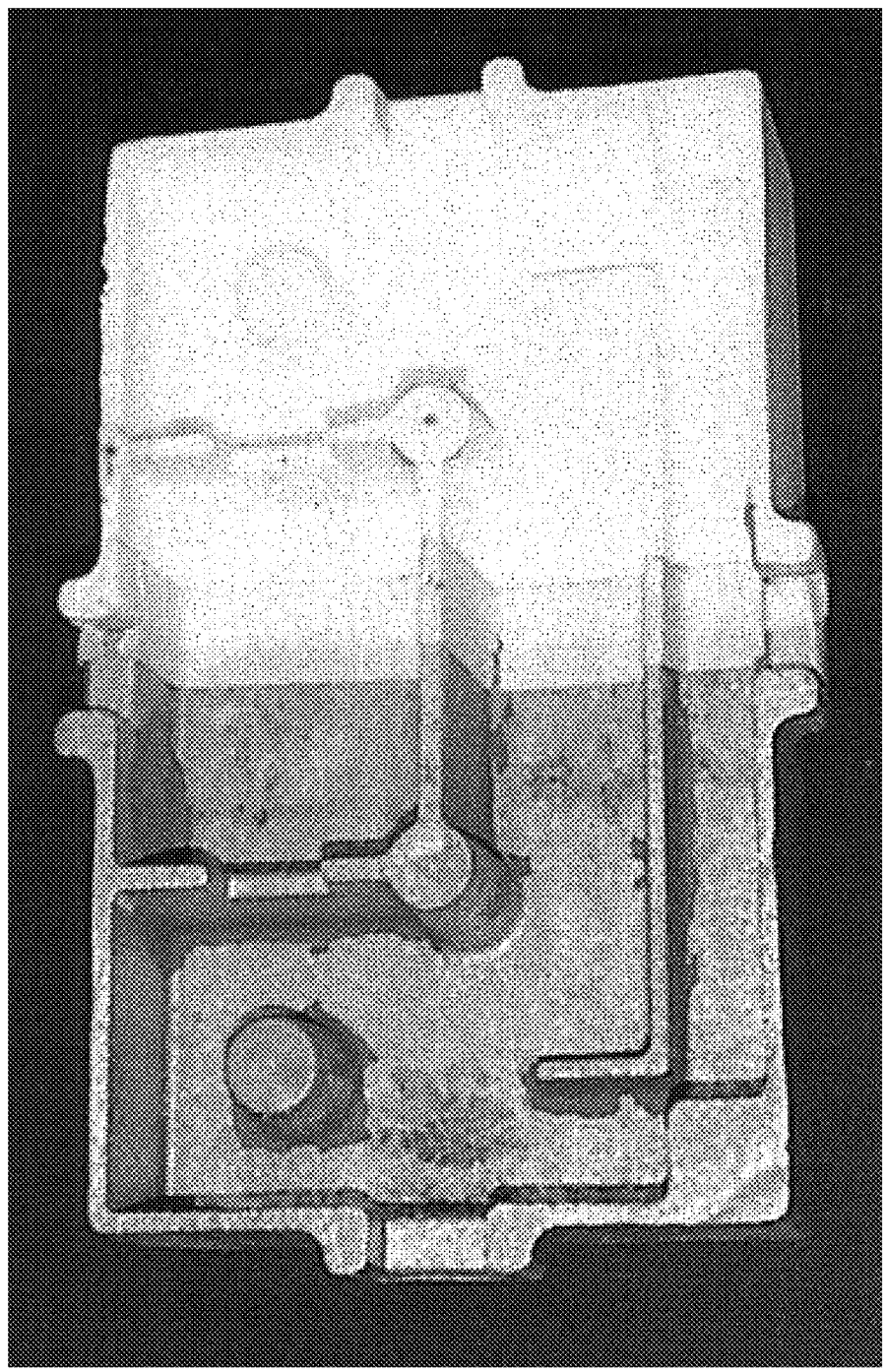
FIG. 6 illustrates an image of a test object.

FIG. 6 is a photograph of an actual object of a corresponding casting that is constructed of two materials. The top portion of the casting is foam and the bottom portion of the casting is aluminum.

According to the present invention, the complete inspection process is modeled, including the source, the detector and sample object. Using the geometric information (i.e. the CAD model of FIG. 5) the object is divided into a plurality of voxels. By applying the model of the inspection process, including the known material properties of the ideal object, the contribution of each voxel to the inspection data is predicted. Based on the deviation between observed and predicted data, the material properties associated with each voxel are adjusted to obtain the best match between the inspection measurements and predictions. Measurements from at least two different orientations are required to avoid ambiguities. The goodness of the match between measured and calculated data is quantified through a statistical test such as a chi square or maximum likelihood test.

For example, when examining a test object, two x-ray images from different views are acquired. Two simulated images based on a CAD model are created. The CAD model is divided into voxels according to assumed material properties for each voxel. The simulated and real images can then be compared pixel by pixel. For those pixels that show a large discrepancy, a projection is made back through the model to determine which voxels could contribute to that difference. A single projection will indicate a line of voxels that could contribute. By using a second projection, one can limit this to only the voxel at the intersection of the two lines. Then, the assumed material property for that voxel is modified and the simulation and comparison process is repeated until the desired goodness of match is obtained.

The present invention provides for combining the model with the inspection data to create a three-dimensional reconstruction of the sample object. The three-dimensional reconstruction can be cast in a format compatible with the original CAD drawing for convenient viewing. In addition, inspection criteria can be imposed to flag defects that are outside of a defined tolerance range. The present invention can be used in an automated process to reject defective parts on a production line, or to provide feedback for a manufacturing process.

Figure 7:
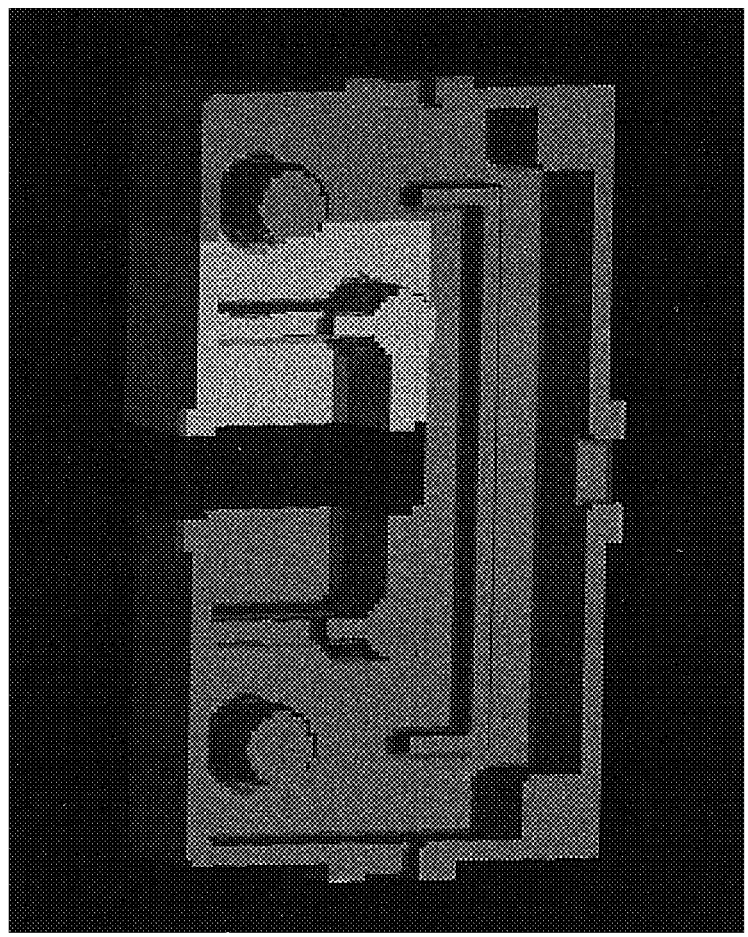
FIG. 7 illustrates a 3-D visualization of a test object.

Thus, the present invention provides for reconstruction of stereographic data for a test object based on a structural model of a first object and inspection data. Once constructed, a representation can be displayed such as is shown in FIG. 7. Note in FIG. 7 that differences in shading indicate differences in material properties. Also, note that the test region that was being inspected was smaller than the casting.

The present invention contemplates variations in the equipment used, the manner of data acquisition, the manner of data analysis, the type of visualization used, and other variations that may be appropriate in a particular application or environment. Two specific examples of applications of the present invention are set forth below. The present invention is in no way limited by or to these examples. These examples are merely illustrative of variations of the present invention.

Visualization of Three-Dimensional Metal Flow in Lost-Foam Metal Casting

In one application of the present invention, x-ray stereography is applied to visualize three-dimensional metal flow in lost-foam metal casting of complex objects such as engine cylinder heads and blocks. In such an application, the present invention provides engineers with significantly improved information on the dynamics of the casting process.

One aspect of this embodiment uses an experimental and numerical method to define the metal front advancement in a complex 3-D lost-foam casting. Lost-foam casting is a convenient way to manufacture complex metal shapes. However, understanding the dynamics of this process has presented a challenging problem. Although, real-time radiography of metal pours has given some insight to the problem, the radiographic images previously obtained are only two-dimensional projections that provide limited information on the dynamics of the process for complex geometries such as cylinder heads and blocks. X-ray stereography is a technique that provides for the desired three-dimensional information. By collecting a sequence of stereographic images, the present invention provides for a visualization of the dynamics of the casting process. The stereographic images can each be used in a frame of a movie or animation of the dynamic process.

In this embodiment, the present invention is used to provide an experimental and numerical method to define the metal front advancement in a complex 3-D lost-foam casting. Certain aspects of this problem can be taken advantage of in developing the visualization of the metal flow. First, the geometry and materials are known, so predictions of the resulting images can be made. For example, the computer simulation of x-ray imaging (XRSIM)[2] can be used. The present invention however contemplates use of any computer simulation method that can be used to simulate x-ray imaging. From a CAD model of a sample and parameterization of source and detector, simulated radiographic images are produced.

Second, the contrast between the metal and the foam is high, so that it is relatively easy to identify the front in the flowing metal. Standard image processing tools can be applied to determine this boundary. Third, as this is a dynamic process, the sequence of images should be causally linked. This provides for the elimination of unphysical solutions to the stereography problem.

The present invention also provides for the display of the results of the calculations. Visualization of three-dimensional data sets has been the subject of a number of conferences and books and is generally known in the art. The present invention contemplates a number of manners in which to provide for visualizations. One convenient and useful visualization of the stereographic data is to display the surface of the metal flow on top of the CAD model.

X-Ray Procedures for Complex Object Inspections

Another application of the present invention relates to x-ray techniques for inspecting complex structures. One example of complex structure, and the one used herein, is turbine blades. Turbine blades used in high-performance engines and power generation systems have complex geometric shapes and often contain internal cooling holes. They may be made of composites and layered materials, and present a large aspect ratio (width/depth). These features make it difficult to inspect these blades for defects using conventional methods such as x-ray CT.

If one were to take individual radiographic projections of a turbine blade, one would adjust the x-ray tube voltage and exposure time to achieve optimum contrast, depending on the projected thickness of the blade for each orientation. Defects will show up clearly in each projection. To determine the three-dimensional location of a defect in the object, computer prediction such as those from XRSIM can be used for each projected image to produce a model of the blade plus defect that gives consistent results for all projections. A minimum of two projections are required to make these calculations.

Thus, in this manner, the present invention provides for improving the inspection of a turbine blade. By merging the model of the data with experimental data, three-dimensional information concerning the turbine blade is produced that can be used in a three dimensional visualization of the turbine blade.

The present invention contemplates numerous variations such as is apparent at least in part from the differences in the applications described herein. In addition, the present invention contemplates numerous variations in the inspection techniques used. For example, the inspection techniques can include film radiography, film digitization and image processing, and digital radiography. The present invention contemplates numerous variations in the object or objects being modeled, the process being modeled, the manner of registering or associating experimental data with predicted data, the manner of displaying a visualization, the use of three dimensional data in a manufacturing or inspection process, the type and size of voxels used, the number and angle of orientations used, and other variations within the broad spirit and scope of the invention.

REFERENCES

1. Edward Doering, "Three-dimensional flaw reconstruction using a real-time X-ray imaging system", PhD thesis, Iowa State University, unpublished (1992).
2. Xu, J., Wallingford, R., Jensen, T. and Gray, J. N., "Recent Developments in the X-Ray Radiography Simulation Code: XRSIM", in *Review of Progress in Quantitative Nondestructive Evaluation*, Vol. 13, edited by D. O. Thompson and D. E. Chimenti, (Plenum Press, New York, 1994) pp. 557–562.

What is claimed is:

1. A method for inspecting objects, comprising:
    obtaining a structural model of a first object, the model providing dimensions and material properties for the first object;
    simulating an inspection of the first object to provide predicted data;
    inspecting a second object to provide inspection data for at least two views of a structure of the second object;
    comparing the inspection data and the predicted data;
    reconstructing stereographic data for the second object based on the structural model of the first object and contributions of the predicted data of the first object and inspection data of the second object to provide three-dimensional information associated with the second object.
2. The method of claim 1 wherein the step of inspecting a second object further comprises applying x-ray stereography.
3. The method of claim 1 further comprising displaying a three-dimensional representation of the three-dimensional information associated with the second object.
4. The method of claim 1 wherein the step of comparing inspection data further comprises associating inspection data with voxels.
5. The method of claim 1 further comprising identifying a flaw in the second object.
6. The method of claim 1 wherein the material properties include a material composition.
7. The method of claim 6 wherein the material composition includes at least two dissimilar materials.

8. The method of claim 1 wherein the material properties include porosity.
9. The method of claim 1 wherein the structural model of the first object is derived from images of the second object acquired at a prior point in time.
10. A method for x-ray inspection of a dynamic process, comprising:
    obtaining a structural model associated with an object, the model providing dimensions and material properties associated with the object;
    initiating the dynamic process, the dynamic process associated with the object;
    simulating an inspection of the object to provide predicted data;
    inspecting the object to provide inspection data derived from at least two views of the object during the dynamic process;
    comparing the inspection data and the predicted data; and
    reconstructing stereographic data for the object from the inspection data and the predicted data.
11. The method of claim 10 further comprising displaying a three-dimensional representation of the object based on the stereographic data.
12. The method of claim 10 wherein the step of displaying is performed during the dynamic process.
13. The method of claim 10 wherein the dynamic process is casting.
14. The method of claim 10 further comprising repeating the steps of inspecting and reconstructing.
15. The method of claim 10 wherein the dynamic process includes flow or mixing of dissimilar materials.
16. A method for inspecting objects, comprising:
    (a) obtaining a structural model of a first object, the model providing dimensions and material properties for the first object;
    (b) dividing the first object into a plurality of regions;
    (c) simulating an inspection of the first object to provide predicted data;
    (d) determining a contribution of each of the plurality of regions to the predicted data;
    (e) inspecting a second object to provide inspection data derived from at least two views of a structure of the second object;
    (f) performing a comparison of the inspection data and the predicted data;
    (g) modifying material properties of each of the plurality of regions in the first object according to a difference between the inspection data and the predicted data;
    (h) repeating steps (c), (d), (f), (g) until the difference between the inspection data and the predicted data is minimized;
    (i) representing three-dimensional information for the second object by a collection of modified material properties for the plurality of regions of the first object.
17. The method of claim 16 wherein each of the plurality of regions is a voxel.

* * * * *